Patented June 9, 1953

2,641,585

UNITED STATES PATENT OFFICE 2,641,585

SYNTHETIC FIBER PREPARATION FROM SOLUTIONS OF ACRYLONITRILE POLYMERS IN DIMETHYL PHOSPHITE

George E. Ham, Dayton, Ohio, assignor, by mesne assignments, to The Chemstrand Corporation, a corporation of Delaware No Drawing. Application November 21, 1950, Serial No. 196,942

7 Claims. (Cl. 260—30.6)

This invention relates to a new method of preparing synthetic fibers from copolymers of acrylonitrile. More particularly the invention relates to a new low-boiling solvent for acrylonitrile polymers, and to completely miscible mixtures including acrylonitrile copolymers, from which mixtures, quality fibers can be extruded.

It is well-known that copolymers of over 75 per cent acrylonitrile are capable of being fabricated into high-strength fibers. The conventional technique for preparing fibers from these copolymers involves the dissolution of the copolymer in a suitable solvent and thereafter extruding the viscous solution so prepared through an orifice into a medium which removes the solvent and precipitates the acrylonitrile copolymer in a continuous form. Many solvents have been proposed but many of them are impracticable due to the excessive cost and due to the tendency of the solutions to gel upon cooling.

The primary purpose of this invention is to provide a new low cost solvent for the preparation of synthetic fibers. A further purpose of this invention is to provide a solvent which forms more stable mixtures or solutions of acrylonitrile copolymers. A still further purpose of the invention is to provide a method of forming fibers of high tensile strength and desirable elongation.

It has been found that dimethyl phosphite (boiling point=109° C.) is an excellent solvent for copolymers of 70 per cent or more of acrylonitrile and up to 30 per cent of other polymerizable monomers. In copending application, Serial No. 117,505, filed September 23, 1949, by George E. Ham, there is described and claimed an invention involving the use of diethyl phosphite as a solvent for polymers of up to 90 per cent acrylonitrile and ten per cent or more of other monomers. The present invention is practicable with all polymers of acrylonitrile including polyacrylonitrile and the copolymers of over 90 per cent acrylonitrile which are not soluble in diethyl phosphite. The invention is particularly useful with polymers of acrylonitrile containing at least 85 per cent acrylonitrile and up to 15 per cent of another polymerizable monomer. The other monomer in the acrylonitrile copolymer may be vinyl acetate and other vinyl esters of monocarboxylic acids, methyl methacrylate and other alkyl esters of methacrylic acid, ethyl acrylate and other alkyl esters of acrylic acid, methacrylonitrile, vinylidene chloride, ethyl maleate and other alkyl esters of maleic acid, ethyl fumarate and other alkyl esters of fumaric acid, styrene and other vinyl substituted aromatic compounds, α-methylstyrene and other isopropenyl aromatic hydrocarbons, vinyl chloride and other vinyl halides, 2-vinylpyridine, 2-methyl-5-vinylpyridine, and other vinyl substituted heterocyclic amines, and other polymerizable monomers capable of copolymerization with acrylonitrile.

The dimethyl ester of phosphorous acid is a compound, the structure of which has not been definitely ascertained. It has sometimes been described as the compound of the structure:

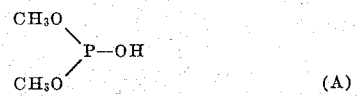

(A)

but infrared spectrum analysis has established the existence of a direct bond between the phosphorus and hydrogen atoms. It is now believed that there is present at least some of a compound having the structure:

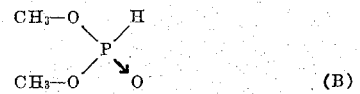

(B)

This compound may be tautomeric with the compound of Formula A.

In the practice of this invention, as it is in the preparation of all acrylonitrile fibers, the molecular weight of the polymer is of critical importance. The polymer should have a molecular weight in excess of 10,000, and preferably in excess of 25,000. These molecular weights are determined by measuring the viscosity of the polymer when dissolved in a suitable solvent, such as dimethylformamide, in the manner well-known to the art. It is also very desirable to use acrylonitrile copolymers which are substantially uniform throughout with respect to the chemical composition and physical structure. Such uniform copolymers enable the practice of the invention more economically, permitting the utilization of continuous uninterrupted spinning and greatly minimizing fiber fractures and clogging of the spinnerets.

In the practice of this invention the polymers of acrylonitrile are used in finely divided form. Although massive polymers may be ground to desired particle size, preferably solvent-non-solvent polymerization procedures are employed in the preparation of the polymer. The sub-divided states of the polymers obtained by spray drying the emulsions or by filtration and subsequent drying of the solid polymers enable them to be used directly. The finely divided polymer is mixed with dimethyl phosphite in any type of mixing device, such as a dough mixer or a homogenizer.

It is desirable to use a solution of as high a concentration of the polymer as possible, but the maximum concentration is dependent upon the molecular weight of the polymer.

To obtain fibers of optimum physical properties, polymers of molecular weights in excess of 25,000 are used, and when using such polymers it is only possible to dissolve from five to 35 per cent in the dimethyl phosphite without exceeding practicable viscosity values. Although as low as five per cent of the polymer can be used in spinning operations, such concentrations are undesirable because they necessitate the removal and recovery of too much solvent from the extruded solution, thereby increasing solvent recovery cost and reducing spinning speeds by reason of the longer periods required for coagulation. The concentraction of the polymer in the solution is preferably between seven and 25 per cent but will ultimately be determined by considering the desired physical properties of the fiber and the speed of spinning, which speed is a function of the concentration and viscosity of the polymer solution. The viscosity will depend upon the chemical composition and the molecular weight of the polymers. The optimum proportions can best be determined by selecting a uniform molecular weight polymer having good fiber forming properties and dissolving it in the smallest amount of the dimethyl phosphite necessary to form a viscous solution capable of extrusion at convenient temperatures.

The fibers are spun by extruding the dimethyl phosphite solution of the acrylonitrile polymer through an orifice, or a spinneret having a plurality of orifices, into a medium which removes the solvent. The volume of the solution passed through the spinneret per unit of time must be constant in order to produce a fiber of uniform size. This is best achieved by using a positively driven gear pump constructed of corrosion-resistant metals, such as stainless steel, and adapted to deliver a constant flow of solution regardless of minor changes in viscosity and regardless of the resistance offered by the spinneret. It is also desirable to pass the solution through one or more filters before reaching the spinneret in order to remove all possible traces of foreign matter and particles of incompletely dissolved polymer. The polymer solution may be delivered to the gear pump by means of pressure applied by an inert gas to the liquid surface of the solution reservoir, which must be heated to maintain the solution fluid enough to pass through the conduits. The gear pump, filter devices and conduits to the spinneret are preferably heat insulated and may be heated to maintain the body of solution in liquid state. The extruding operation should be conducted at elevated temperatures, but far enough below the boiling point of the solvent to prevent bubbles or other irregularities in the fiber.

The medium into which the solution is extruded and which removes the solvent may be either liquid or gaseous. The method involving the use of liquids is known as "wet spinning"; and any liquid which is a non-solvent for the acrylonitrile polymer, but which either dissolves the dimethyl phosphite, or converts it into soluble compounds, may be used. The solvent is leached out of the stream of polymer solution, which first becomes a viscous stream and finally a solid filament. When a spinneret with a plurality of apertures is used the several streams of polymer converge and ultimately form a single fiber. The spin bath must necessarily be of sufficient size to permit the complete, or substantially complete, removal of the dimethyl phosphite. Obviously the rapidity of extrusion will affect the size of the spin bath, high speeds requiring much longer baths. The temperatures of the bath also affect the size, higher temperatures permitting more rapid diffusion of the dimethyl phosphite from the fiber and enabling the use of shorter baths. Wet spinning procedures for fiber preparation may involve the use of various organic liquids, for example acetone, dioxane, ethylene dichloride, tetrahydrofuran, benzene, xylene and toluene, and any other miscible anhydrous organic compounds which are liquid at room temperature or at the spinning temperatures. The use of anhydrous liquids avoids the hydrolysis of the dimethyl phosphite which may take place in the presence of an aqueous spinning medium.

The use of dimethyl phosphite as a solvent for acrylonitrile copolymer is especially adapted to "dry spinning" operations, wherein air, steam, nitrogen or other gas, or mixtures of gases which are inert at the spin temperature, are used to remove the solvent. This method operates at higher temperatures; and the dimethyl phosphite is evaporated from the surface of the fiber. The maximum temperature to which the fibers can be subjected is usually the boiling point of the dimethyl phosphite, but higher temperatures may be attained by subjecting the operation to pressures higher than normal atmospheric pressure. The fiber may be heated by convection from the hot gaseous medium or by radiation from the walls of the spinning cell. Generally a combination of both convection and radiation is involved, but methods involving principally radiation are generally more efficient and permit the operation with the wall temperature considerably in excess of the boiling point of the dimethyl phosphite. The evaporation of the dimethyl phosphite from the fiber surface and the speed of the fiber prevent the development of a temperature exceeding that at which the fiber is stable to decomposition. The dry spinning method is particularly useful at high rates of extrusion.

In general the methods of both wet and dry spinning commercially used are adaptable for spinning from dimethyl phosphite solutions, but special considerations may be involved due to the different chemical nature of dimethyl phosphite. Automatic machinery for spinning continuously, drying the thread if necessary, and winding it on suitable spools may be modified with the teaching of this specification. As in the case of most synthetic fibers, the fibers of acrylonitrile copolymers spun from dimethyl phosphite solutions may be stretched to develop optimum physical properties. If desired, part of the necessary stretching may be accomplished in the spinning medium by drawing the fiber out of the bath at a rate more rapid than the rate of extrusion.

The dimethyl phosphite is also useful as a solvent for processing fibers from blended compositions. Since many acrylonitrile polymers are not dyeable by conventional dyeing procedures, it has been proposed to blend them with polymers capable of reacting chemically with dyestuff, whereby the mixed compositions acquire dyeability such that the fibers have general purpose utility. Suitable blending agents are the polymeric compositions of polymerizable monomers containing tertiary amino radicals or other radicals capable of being converted into tertiary amino groups subsequently to the polymerization. Thus copolymers of vinylpyridines, for example 2-vinylpyridine, the alkyl vinylpyridines, for example 2-methyl-5-vinylpyridine, the various vinylquinolines and alkyl substituted vinylquinolines, the various vinylpyrazines and alkyl substituted vinylpyrazines, the various vinyloxazoles and imidazoles including N-vinylimidazoles, and the vinylbenzimidazoles are useful. Similarly related allyl and methallyl derivatives of the above compounds are useful. The vinyl, allyl, and methallyl haloacetates can be reacted with secondary amines either before or after polymerization, and the polymers formed thereof blended with nondyeable acrylonitrile polymers to develop dye affinity. These dyeable blending polymers may be homopolymers or they may be copolymers with any monomer polymerizable therewith, for example, acrylonitrile, styrene, butadiene, vinyl chloride, vinylidene chloride and vinyl acetate. In blending the polymers a substantial proportion of the fiber forming acrylonitrile polymer, for example 80 per cent to 98 per cent, should be used, depending upon the extent of dye receptivity desired and upon the proportion and relative effectiveness of the reactive monomer present. For example, a suitable blending polymer is one containing 10 to 70 percent by weight of acrylonitrile and 30 to 90 percent by weight of a vinylpyridine or an alkyl-substituted vinylpyridine. Suitable blends or blended compositions are those containing at least 75 percent by weight of acrylonitrile based on the total polymerized monomers in the blend. In general from two to ten per cent of the total of all polymerized monomers present should be the reactive component.

Further details of this invention are set forth with respect to the following examples:

*Example 1*

A finely divided copolymer of 93 per cent of acrylonitrile and seven per cent vinyl acetate was suspended in nine parts of dimethyl phosphite. By heating to ca. 100° C. with stirring, a clear colorless solution resulted which was stable at room temperature. Fibers of good strength were prepared by precipitating in air or water. Clear and colorless films were prepared by casting on a smooth surface and evaporating the dimethyl phosphite.

*Example 2*

One part of a copolymer of 97 per cent acrylonitrile and three per cent vinyl acetate was placed in a sealed vessel with ten parts of dimethyl phosphite and heated for one hour at 150° C. A clear viscous solution which was stable on cooling was obtained from which films and fibers of good strength were prepared.

*Example 3*

Using polyacrylonitrile in place of acrylonitrile copolymers, it was found that solutions in dimethyl phosphite could be prepared at elevated temperatures.

What I claim is:

1. A new composition of matter comprising a homogeneous miscible mixture of from 65 to 95 per cent by weight of dimethyl phosphite and from five to 35 per cent of a copolymer of at least 75 per cent of acrylonitrile and up to 25 per cent of another copolymerizable monomer.

2. A new composition of matter comprising a homogeneous miscible mixture of from 65 to 95 per cent by weight of dimethyl phosphite and from five to 35 per cent of a copolymer of at least 75 per cent of acrylonitrile and up to 25 per cent of vinyl acetate.

3. A new composition of matter comprising a homogeneous miscible mixture of from 65 to 95 per cent by weight of dimethyl phosphite and from five to 35 per cent of a copolymer of at least 75 per cent of acrylonitrile and up to 25 per cent of vinylpyridine.

4. A new composition of matter comprising a homogeneous miscible mixture of from 65 to 95 per cent by weight of dimethyl phosphite and from five to 35 per cent of a blend of (A) a copolymer of at least 75 per cent acrylonitrile and up to 25 per cent of vinyl acetate and (B) a copolymer of from ten to 70 per cent by weight of acrylonitrile and from 30 to 90 per cent of a compound of the group consisting of the vinylpyridines and the alkyl substituted vinylpyridines.

5. The composition defined by claim 6 wherein the acrylonitrile polymer is a blend of (A) a copolymer of at least 85 per cent of acrylonitrile and up to 15 per cent of another polymerizable monomer and (B) a copolymer of from 30 to 90 per cent of a compound of the group consisting of vinylpyridines and alkyl substituted vinylpyridines and from ten to 70 per cent of acrylonitrile.

6. A new composition of matter comprising a homogeneous miscible mixture of from 65 to 95 percent by weight of dimethyl phosphite and from 5 to 35 percent of a polymer of which acrylonitrile is at least 75 percent of the total polymerized monomer content of the polymer.

7. A new composition of matter comprising a homogeneous miscible mixture of from 65 to 95 percent by weight of dimethyl phosphite and from 5 to 35 percent of a blend of (A) a copolymer of at least 75 percent acrylonitrile and up to 25 percent of another polymerizable monomer and (B) a copolymer of from 10 to 70 percent by weight of acrylonitrile and from 30 to 90 percent of a compound selected from the group consisting of the vinylpyridines and alkyl-substituted vinylpyridines.

GEORGE E. HAM.

References Cited in the file of this patent

UNITED STATES PATENTS

| Number | Name | Date |
|---|---|---|
| 2,456,360 | Arnold | Dec. 14, 1948 |
| 2,503,245 | Coover et al. | Apr. 11, 1950 |